April 2, 1968     G. FITZ HENRY ET AL     3,375,851
SWINGDOWN DRAIN TROUGH
Filed Feb. 21, 1966     2 Sheets-Sheet 1
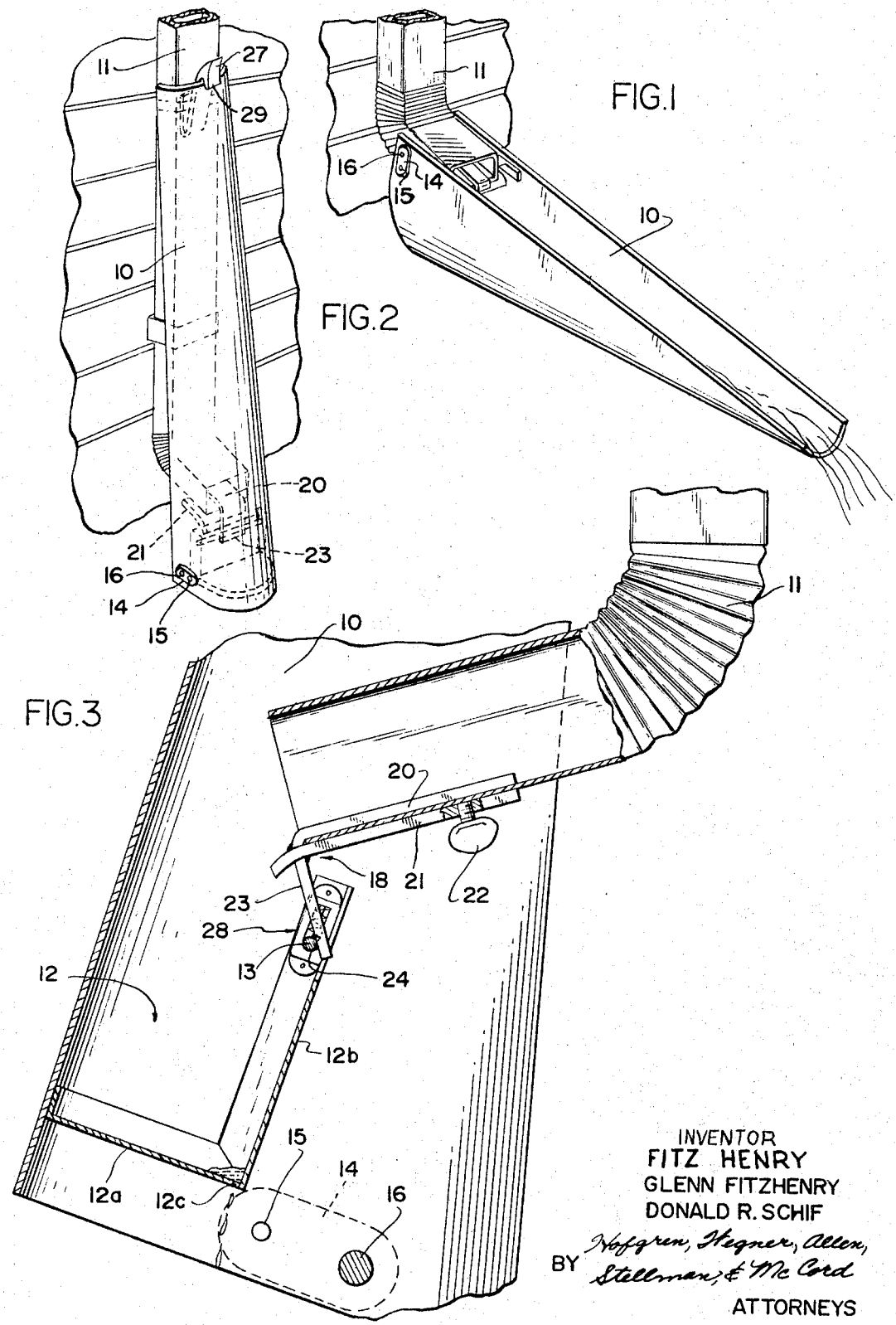
INVENTOR
FITZ HENRY
GLENN FITZHENRY
DONALD R. SCHIF
BY Hofgren, Wegner, Allen, Stellman, & McCord
ATTORNEYS April 2, 1968  G. FITZ HENRY ET AL  3,375,851
SWINGDOWN DRAIN TROUGH
Filed Feb. 21, 1966  2 Sheets-Sheet 2
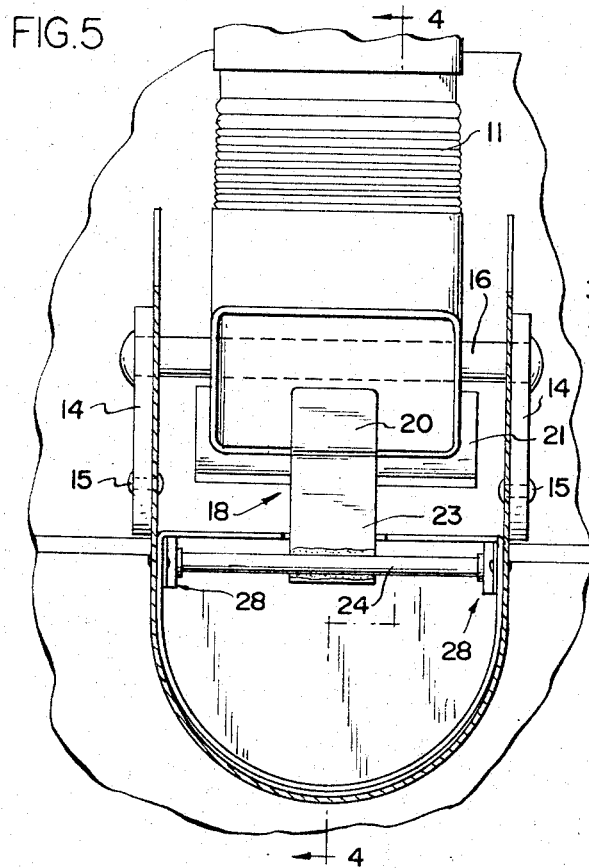
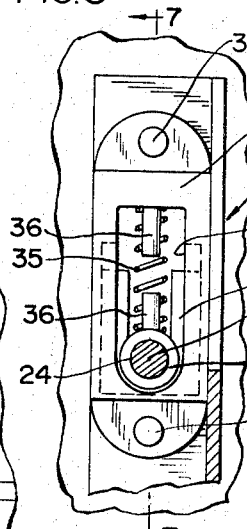
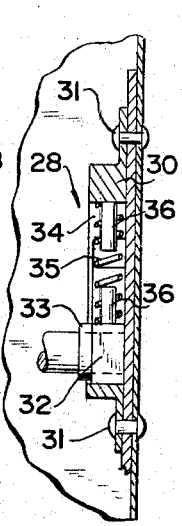
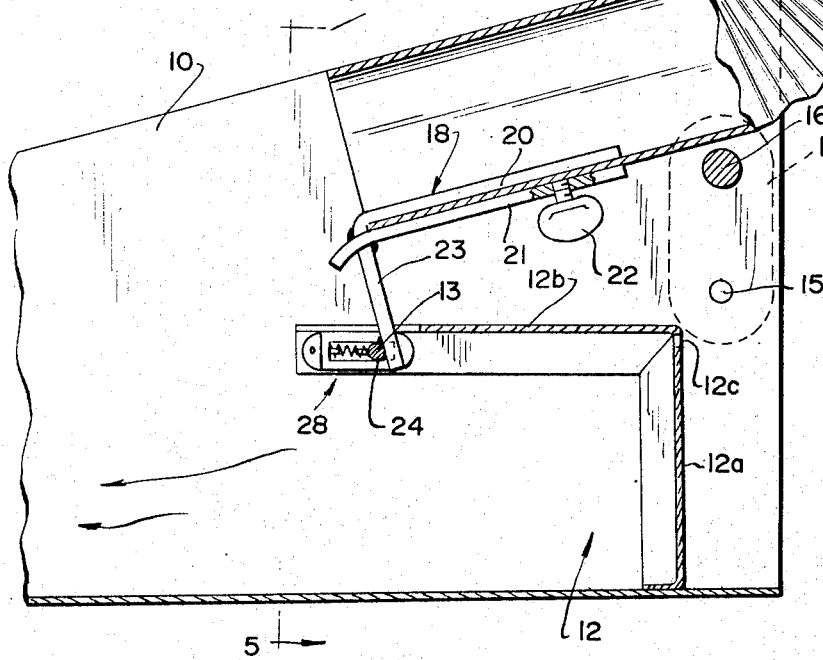

United States Patent Office 3,375,851
Patented Apr. 2, 1968

3,375,851
SWINGDOWN DRAIN TROUGH
Glenn Fitz Henry, Onarga, and Donald R. Schif, Paxton, Ill., assignors to Schif Enterprises Inc., a corporation of Illinois
Continuation-in-part of application Ser. No. 408,073, Nov. 2, 1964. This application Feb. 21, 1966, Ser. No. 528,866
10 Claims. (Cl. 137—396)

ABSTRACT OF THE DISCLOSURE

An automatic swingdown trough for downspouts to convey water away from a building, in which the trough rotates between an up and a down position. A counterbalance receptacle is mounted in the trough such that water from the downspout will fill the receptacle and thereby rotate the trough to the down position. The counterbalance receptacle rotates with the trough and is emptied when the trough is in the down position. The trough and the counterbalance receptacle return to the up position when water is not flowing from the downspout. A latch arm extends outwardly from the downspout to hold the trough in its up position when water is not flowing from the downspout, and spring loaded floating bearings mount the trough to the downspout such that the springs in the bearings are compressed when the receptacle is filled with water to move the trough out of engagement with the latch arm and permit the trough to rotate to the down position.

Background of the invention

This is a continuation-in-part of our application Ser. No. 408,073, filed Nov. 2, 1964, now abandoned, and relating to an automatic swingdown trough for downspouts.

Summary of the invention

One object of the invention is to provide a swingdown trough to carry all the water caught by the eave troughs away from the building. This will give the foundation protection and alleviate basement flooding. The device is completely automatic.

Another object of this invention is to provide a sturdy, inexpensive and easily made device. The trough is pivotally mounted to a downspout and counterweights mounted securely to the trough cause it to swing up against the downspout. A counterbalance receptacle formed within the trough fills with water when it rains and causes the trough to swing down to a position in which water is carried away from the building. Metal is saved and the trough construction is stronger because of the construction of the receptacle within the trough. All the parts pivot around a single axis thereby keeping the number of bearings used to a minimum.

A further object is to provide a reliable device. The counterbalance receptacle rotates with the trough and is emptied with the dumping motion. Thus, any debris caught in the receptacle will be washed out. A small hole is placed within the counterbalance receptacle to drain small amounts of water and to reduce rusting. If perchance the drainage hole were to become clogged, the receptacle would merely continue to fill, thereby rotating the trough, and emptying the receptacle. Even if the drain were to become permanently blocked, the device would continue to operate.

Still a further object of this invention is to provide a trough which will not be unsightly. In its upright position the trough stands inconspicuously against the building. Since the counterbalance receptacle and supporting mechanism are hidden inside the trough, an unblemished surface is presented.

Yet another object of this invention is to provide a device of the character described including a latch means to maintain the trough in its upright position and including a weight responsive, spring loaded floating bearing in the connections between the trough and the downspout whereby the weight of the water accumulated in the counterbalance receptacle acts through the floating bearing to release the latch and permit the trough to swing down.

An additional object is to provide a device which can be easily installed and which is designed so that it may be interchangeably installed on a variety of downspouts.

Further objects and advantages will become apparent from the following detailed description taken in connection with the accompanying drawings, in which:

FIGURE 1 is a perspective view of the trough assembly in the down position;

FIGURE 2 is a perspective view of the trough assembly in the up position;

FIGURE 3 is a detail cutaway view showing the clamp attaching mechanism and counterbalance receptacle with the trough in the up position;

FIGURE 4 is a view similar to that of FIGURE 3 with the trough in the down position;

FIGURE 5 is a sectional view taken generally along the line 5—5 of FIGURE 4.

FIGURE 6 is a cutaway view showing one of the spring loaded floating end bearings; and FIGURE 7 is a central sectional view of the floating end bearing generally along the line 7—7 of FIGURE 6.

In FIGURES 1 and 2 the carryoff trough 10 is shown to be pivotally attached to the downspout 11 as will be described later. The trough 10 may be made in any suitable length. The downspout 11 may be either round or rectangular.

When rain falls, water flows from the downspout 11 into a counterbalance receptacle 12, FIGURE 3. As the receptacle fills with water the center of gravity shifts away from the building until it has shifted outside the pivot axis 13. The trough 10 then rotates to the down position shown in FIGURES 1 and 4.

The trough 10 is constructed from a piece of metal in the form of a trapezoid which is bent around its longitudinal axis into a U-shape. Across its base, a plate 12a is attached. A second plate 12b is placed on the inside of the trough perpendicular to the base plate 12a forming the receptacle 12. Of course, plates 12a and 12b and trough 10 might be combined into one suitably formed piece. The counterbalance receptacle 12 should be watertight except for a small drain hole 12c in the base plate 12a which prevents the accumulation of water from a light shower.

When the water stops flowing through the trough 10, the center of gravity shifts back to the building side of the pivot axis 13 and the trough rotates back to the up position.

Counterweights 14 are attached to the trough 10 on the building side of the pivot axis 13. The counterweights must be sufficiently large to outbalance the weight of the empty trough on the other side of the pivot axis 13; but not so large as to outbalance the combined weight of the trough and counterbalance receptacle 12 when filled with water.

As shown in FIGURE 4, the weights 14 are attached to the trough 10 by rivets 15 and a supporting brace 16 which extends between the side walls of the trough. The counterweight and brace are a single piece for ease of assembly. Of course, other fasteners might be used, but the brace 16 performs a dual role of securing the counterweights to the trough side walls as well as strengthening the trough 10 by supporting the side walls in their spaced relation.

The trough is secured to the downspout by means of a clamp, generally designated 18, FIGS. 4 and 5. The clamp is comprised of two parallel metal plates 20 and 21. The bottom plate 21 is drilled and threaded to receive a thumbscrew 22 which frictionally engages and holds the downspout 11. A tongue 23 depends downwardly from the front edge of the upper plate 20 through an elongated aperture in the bottom plate 21. The two parallel plates are welded together about the aperture which embraces tongue 23. The bottom plate 21 is preferably wider than the mouth of the downspout and extends outwardly beyond tongue 23 a sufficient distance to direct water from the mouth of the downspout into the counterbalance receptacle 12. A pivot shaft 24 is welded adjacent the lower edge of tongue 23 and has its ends mounted in floating end bearings mounted on the trough side walls as hereinafter described.

The trough includes a weight responsive latch means to releasably hold the trough in its up position. The latch means generally includes a latch arm 27, FIGURE 2, and spring loaded floating end bearings, generally designated 28, as best illustrated in FIGURES 6 and 7. The latch arm 27 is secured to and extends outwardly from the downspout 11 and has a lip portion 29 embracing the outer edge of the trough when in its up position. The lip is made of plastic or like material which is sufficiently flexible to permit the trough to snap under lip 29 as the trough returns to its up position. But the lip 29 is of such a configuration or inclination to prevent the trough from moving away from the building to its down position, except through the facility of the floating end bearings described below.

The floating end bearings 28, FIGURES 6 and 7, include a nylon housing portion 30 attached to the trough side walls by rivets 31 and a nylon bearing portion 32 slidable in the housing. The bearing portion has a hollow boss 33 which extends through and slides in a vertical slot 34 in the housing portion. The hollow boss receives the pivot shaft 24 which is fixed to the tongue 23 of clamp 18. A compression spring 35 is disposed in the housing and urges the housing 30 and trough 10 upwardly (FIGURES 6 and 7) in relation to the fixed shaft 24 and downspout 11. Lugs 36 keep the spring in its proper position in the housing portion 30. As the counterbalance receptacle fills with water, the combined weight of the water and the trough compress spring 35 moving the trough vertically downwardly out of its embracing engagement under lip 29 of latch arm 27 and the trough can swing to its down position.

Obviously, the floating connection which permits the weight of the water and trough to trip the latch means could be disposed in the downspout itself, as well as other appropriate positions. The embodiment illustrated is but a preferred choice.

*Operation*

The operation of the device is quite simple. In the absence of rain, trough 10 is in the up position shown in FIGURE 2. When the rain starts to fall, the trough is in the upright position of FIGURE 2. The water coming out of the downspout 11 fills the counterbalance receptacle 12, compressing spring 35 and disengaging the trough from latch arm 27. After the center of gravity shifts to the outside of the pivot axis 13, the trough will pivot around the support rod and assume the down position shown in FIGURE 1.

When this happens, the receptacle 12 will empty, cleaning itself of any debris. If the flow of water through the downspout is sufficient, the weight of the water flowing through the trough will hold it down as shown in FIGURE 1. When the rain stops, no water will flow through the trough, and as the counterbalance receptacle is empty, the center of gravity shifts back to the building side of the pivot axis, and the trough will rotate to the up position and snap under the flexible latch arm.

The small hole 12c allows any residual moisture to escape, thereby inhibiting rust. By dumping the receptacle in the down position, this drain will many times become unclogged.

While an illustrative embodiment of the invention is shown in the drawings and described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

We claim:

1. An automatic swingdown trough for downspouts to convey water away from a building, comprising: a trough for rotation between an up and a down position attached to said downspout by means of a support; and a counterbalance receptacle mounted on said trough and having a water receiving opening, said opening being upwardly disposed to receive water from the downspout when the trough is in the up position, such that water from said downspout will fill said receptacle thereby rotating said trough to the down position said receptacle rotating with the trough and the water receiving opening being downwardly disposed to empty the receptacle in the down position of the trough, said trough and said counterbalance receptacle having a mass distribution in relation to said support sufficient to rotate said trough to the up position when water is not flowing from said downspout.

2. The trough of claim 1 including a latch arm extending outwardly from the downspout and embracing a portion of the trough to hold the trough in its up position adjacent the downspout, and including spring loaded floating end bearings mounting the trough on said support to allow the trough to turn around said support, said end bearings being responsive to the weight of water in said counterbalance receptacle whereby the springs in said bearings are compressed when the receptacle is filled with water to move the trough out of its embracing engagement with said latch arm and permit the trough to rotate to the down position.

3. The trough of claim 1 wherein said latch means includes a latch arm between the trough and the downspout to hold the trough in its up position, and including a means responsive to the weight of water in said counterbalance receptacle to trip the latch arm whereby said latch arm is tripped when the receptacle is filled with water to permit the trough to rotate to its down position.

4. The trough of claim 1 wherein the mass distribution is made adjustable by means of counterweights mounted directly on the trough, the support being between the counterbalance receptacle and the counterweights when the trough is in the up position.

5. An automatic swingdown trough for a downspout to carry water away from a building, comprising: a trough rotatably attached to said downspout by means of a support and clamp; counterweights mounted on the end of said trough; and a counterbalance receptacle formed within said trough and having a water receiving opening, said opening being upwardly disposed to receive water from the downspout when the trough is in the up position, the weight of the trough and the receptacle substantially filled with water being sufficient to rotate the trough to the down position and the weight of the counterweights being sufficient to rotate the trough to the up position unless water is flowing through the trough, said receptacle rotating with the trough and the water receiving opening being downwardly disposed to empty the receptacle into the trough in the down position of the trough.

6. The trough of claim 5 wherein said trough is mounted on said support with nylon end bearings which allow said trough to rotate around said support.

7. The trough of claim 5 wherein said trough is U-shaped and has a first plate mounted therein generally transverse to the longitudinal axis thereof, and a second plate mounted in said trough, said first and second plates forming the counterbalance receptacle, said trough, and first and second plates having a mass distribution in relation to said support sufficient to hold said trough in an up position when water is not flowing from said downspout.

8. The trough of claim 7 wherein said first plate is perpendicular to said longitudinal axis and said second plate is perpendicular to said first plate.

9. The trough of claim 5 including a latch means to releasably hold said trough in its up position, said latch means being responsive to the weight of water in said counterbalance receptacle to release the trough when the receptacle is filled and permit the trough to rotate to the down position.

10. An automatic swingdown trough for downspouts to convey water away from a building, comprising: a trough for rotation between an up and a down position attached to said downspout by means of a support; a counterbalance receptacle mounted on said trough, such that water from said downspout will fill said receptacle thereby rotating said trough to the down position, said trough and said counterbalance receptacle having a mass distribution in relation to said support sufficient to rotate said trough to the up position when water is not flowing from said downspout; and a latch means releasably holding said trough in its up position, said latch means being responsive to the weight of water in said counterbalance receptacle to release the trough when the receptacle is filled and permit the trough to rotate to the down position.

References Cited

UNITED STATES PATENTS

| | | | |
|---|---|---|---|
| 427,206 | 5/1890 | Suddick | 137—120 |
| 2,567,004 | 9/1951 | Benck | 239—510 X |
| 2,930,392 | 3/1960 | Smith | 137—612 X |

WILLIAM F. O'DEA, *Primary Examiner.*

D. R. MATTHEWS, *Assistant Examiner.*